Patented Nov. 21, 1933

1,936,106

UNITED STATES PATENT OFFICE 1,936,106

PROCESSING OF LATEX AND PRODUCT OF SAME

James Barret Crockett, Cambridge, Mass.

No Drawing. Application January 19, 1929
Serial No. 333,755

13 Claims. (Cl. 87—17)

This invention relates to rubber cements and processes of manufacturing the same. The invention has for one of its objects the production of a strong, tough and highly efficient binding medium capable of use under a wide range of conditions and in varied industries. Another object is to produce an improved rubber cement by simple apparatus in a relatively short time, at low cost, and with a great reduction in power consumption.

References have been made in the past to organic solvents acting as coagulants of rubber latex. I have found in mixing organic solvents with latex, that while the latex suspension may be broken in certain cases, no true coagulative effect takes place. On adding preserved Hevea latex to organic solvents or so called rubber solvents, such as by pouring a small quantity of commercial ammoniated latex into a quantity of the solvent, the latex on coming in contact with the surface of the solvents sinks to the bottom or remains on top, depending on the specific gravity of the solvent, in a white, limpid, watery mass. On slightly shaking the container, the limpid mass breaks into small drops which appear to be drops of the latex serum containing suspended rubber particles. On removing and examining these drops under the microscope, in many cases the rubber particles therein are found to be still in Brownian movement showing that the solvent has not had any true coagulative effect on the rubber in the latex and, while the continunity of the latex suspension has been broken, such aggregation, floculation or coalescence as has occurred has been due to the swelling action of the solvent on the rubber particles rather than any true coagulative action causing the particles to run together. In any event, certainly there is no coagulation of the rubber in a reticulate form such as would be the case if the latex were added to an acid or a solution of an acid salt or electrolyte or any of the well known or commercially used rubber latex coagulants. Furthermore, I have observed that Hevea latex containing an alkali and concentrated to about 60 to 80% total solid content by the addition of protective colloids such as soap is remarkably stable in contact with organic solvents and that they may be mixed with same without causing coagulation in a true sense. I have added a wide variety of organic solvents to such concentrated latex pastes containing protective colloids and found that if the mixture is agitated, for instance, by stirring, that after some period of time, there will be a gradual absorption of the solvent by the rubber together with swelling of the mass, and if sufficient quantities of solvents are added with continuous stirring, the final result will be a rubber cement comprising a swollen continuous phase of expanded rubber of a viscous and pasty nature. At no time is coagulation in the form which would occur by the action of an acid or an acid salt or similar coagulant observable. As an example of the resistant action of such protected, concentrated latex pastes to solvents, I have added organic solvents to the paste, allowed the mixture to stand over night and subsequently evaporated off the greater part of the solvent and been able to disperse the remaining paste in water with no evidence whatever of reticulate coagulation. Such aggregation as has in this case occurred on the surface has been due to evaporation and contact with air after absorption of the solvent.

On adding organic solvents to stabilized Hevea latex, the solvent dependent on its specific gravity merely floats on top or sinks to the bottom of the latex and, while the continuity of the suspension is broken, no reticulate coagulation or separation of serum takes place. It is well known that an organic solvent may be emulsified in water and mixed with latex without any apparent action whatever taking place even on long standing, but I am not referring herein to emulsions of solvents. According to the methods hereindisclosed, the solvent and the latex or concentrated latex, hereinbefore referred to, are intimately mixed as by stirring or agitating for a period of time, varying with the solvent employed and the characteristics of the latex, the solvent will be gradually absorbed by the rubber, causing the rubber to swell, and if the process is continued long enough, the result will be a viscous mass of aggregated swollen latex rubber particles in continuous phase, said material being pasty and sticky and of a color which varies from a yellowish or straw color to a milky color, depending upon the solvent used and the amount of water in the latex, i. e., the concentration of the latex. In other words, the color of the viscous mass constituting the finished cement depends upon the amount of the latex water or serum which becomes distributed therethrough, as well as upon the character of the solvent employed. The viscosity and smoothness of the material will vary with the amount of solvent added and the time and nature of the agitation employed, and the swelling may be carried to a maximum or not. According to the old, well known process of making rubber cements, ordinary coagulated rubber, either milled and broken down or not, is subject to treatment in a churn or mixer for long periods of time, and the method herein described is a new and more direct method with saving of time, power and operations, and contemplates treating uncoagulated rubber latex direct with an organic solvent and not in any case coagulated or broken down rubber. The product obtained is superior to cements obtained by the old and usual method in that it has longer life, is tougher, and has stronger binding properties.

I have further found that in the process where latex, whether concentrated or not, is treated with an organic solvent followed by stirring or agitation, that the entire process can be greatly expedited and the time element greatly reduced by adding a small amount of an acid, an acid salt or electrolyte or any of the well known or usually employed coagulants of rubber, which if added direct to latex cause a running together of the rubber particles and a direct coagulation of a more or less reticulate nature as generally understood. If such coagulants are added in small amounts to the solvent before the solvent is mixed with or brought in contact with the latex, or if they are added to a mixture of latex and a solvent at an intermediate stage or stages in the process, there appears to be a simultaneous action of the acid and the solvent on the rubber, causing a comparatively instantaneous absorption by the rubber of the solvent with very rapid and visible swelling. It is thus possible to obtain the desired product in a minimum of time by the simultaneous action of an organic solvent and an acid on latex.

It appears that the degree of alkalinity of the preserved latex affects the time element involved. For instance, it has been observed when mixing latex containing a high amount of ammonia with an organic solvent followed by agitation, that the time required for absorption of the solvent by the rubber is prolonged as compared with latex containing only a small amount of ammonia, and in either case on adding sufficient of an acid to neutralize any ammonia or alkali present, that the time of mixing is greatly reduced; on adding acid in excess, the time is further reduced, dependant on the amount of acid added. It would be expected that acid or an electrolyte would have the effect of thickening the mass through their action as coagulants, and the change of the hydrogen ion concentration caused by their addition, but the effect observed appears to be not only a more rapid agglomeration of the particles and thickening of the mass, but a more rapid absorption of the solvent present by the rubber. This is particularly true where the hydrogen ion concentration is greater than $10^{-7}$. In any event, it appears that increasing the hydrogen ion concentration has the effect of shortening the time of carrying out the process.

The following examples are given for illustrative purposes only and without intention to limit the invention as it is obvious that there are many possible variations.

1. To one liter of gasoline 72° Bé., there is added 200 cc. of normal latex containing 30% solids and 1.87% ammonia. After agitation of about one hour with a high speed stirrer, the rubber has absorbed the solvent with very gradual thickening and swelling to a viscous mass.

2. The same as Example 1, except that the latex used contains less than 1% ammonia. In this case the time of stirring is reduced to approximately 25 minutes.

3. The same as Example 1 except that the proportions are increased ten times and the agitation is carried out in an ordinary pony cement mixer. The operation requires about three hours.

4. The same as Example 2, except that 10 cc. of glacial acetic acid is added to the solvent before the latex. The time of stirring is reduced to five minutes to complete the operation.

5. To 4 liters of gasoline, there is added 8 ozs. of concentrated latex containing approximately 70% total rubber solids and about 6% soft soap on the rubber plus a small percentage of a non volatile alkali such as potassium hydroxide. The time required for stirring is about one and one-half hours.

6. The same as Example 5, except that 10 cc. of cresylic acid is added shortly after the stirring is started. The time of the stirring operation is reduced to 20 minutes.

7. To one pound of a concentrated latex paste such as used in Example 5, there is slowly added while stirring in a cement mixer two gallons of ethylene dichloride. The absorption is very gradual at first but after one hour with increasing additions of solvent progresses more rapidly, and is substantially complete in one hour and twenty minutes.

8. To 150 cc. of carbon bisulphide, add 10 cc. of normal latex. In twenty minutes stirring by hand a white pasty mass is obtained which becomes smooth on standing a few days. Using carbon tetra chloride as the solvent, the action is similar and in either case the addition of two cc. of hydrochloric acid causes the operation to be completed in approximately five minutes. The addition of a highly saturated alum solution also has a visible and similar hastening effect.

9. To two liters of benzol, there is added a small amount of formic acid until a decided acid reaction to litmus is shown. To this is added with vigorous stirring, 200 cc. of normal latex containing about 38% rubber solids and about 1% ammonia. This operation requires only approximately five minutes to obtain a uniform swollen mass of medium body and viscosity.

10. To 500 cc. of normal latex, 30% rubber content, there is added an equal amount of an organic solvent such as solvent naptha or xylol with vigorous stirring. At various times during the continuance of the stirring operation, 1500 cc. of solvent is slowly added. The operation requires from twenty minutes to two hours to complete, depending on the solvent or solvents used.

The addition of small amounts of an acid or electrolyte during the processes greatly hastens their completion. Among the organic solvents found suitable are those obtained from the paraffins, coal tar hydrocarbons, the esters, such as carbon tetra chloride, glycols and their oxidation products unsaturated hydrocarbons, turpentine and oils of the terpene series.

In connection with the above examples, it is to be understood that the time to complete the process will vary according to the stability and condition of the latex, its hydrogen ion concentration, and the quality of the solvent used.

The term acid as used herein is intended to embrace acidic materials including free acids, salts which hydrolize to give an acid reaction, and buffer materials of a suitable hydrogen ion concentration.

What I claim is:—

1. A rubber cement comprising a mixture of 150 rubber latex and a rubber solvent in amount greatly exceeding said latex, the rubber particles in said mixture being combined with said solvent and being in such fully solvent-swollen condition as to be a continuous viscous mass by virtue of said solvent action alone.

2. A rubber cement comprising concentrated rubber latex having a solids content considerably in excess of natural latex in admixture with a rubber solvent in amount greatly exceeding said latex, the rubber particles in said mixture being combined with said rubber solvent and being in such fully solvent-swollen condition as to be a continuous viscous mass by virtue of said solvent action alone.

3. A rubber cement comprising rubber latex having a solids content of about 60% to 80% in admixture with a rubber solvent in amount greatly exceeding said latex, the rubber particles in said mixture being combined with said solvent and being in such fully solvent-swollen condition as to be a continuous viscous mass by virtue of said solvent action alone.

4. A rubber cement comprising latex admixed with a sufficient amount of rubber solvent to convert said mixture by said solvent action alone into a viscous product in which the rubber particles are swollen and aggregated as a continuous phase.

5. A rubber cement comprising a mixture of rubber latex, a rubber solvent in amount greatly exceeding said latex, and an acid, the rubber particles in said mixture being swollen and aggregated by said solvent into a continuous phase through which the water of said latex is distributed.

6. A rubber cement comprising a mixture of rubber latex, a rubber solvent in amount greatly exceeding said latex, and sufficient acid to impart to said mixture a hydrogen ion concentration of greater than $10^{-7}$, said cement being a viscous, sticky, continuous mass through which the water of said latex is distributed.

7. A process of converting latex into a rubber cement, which comprises agitating a mixture of rubber latex and a rubber solvent in amount greatly exceeding said latex until the rubber particles have combined with and have been swollen by said solvent to generate a viscous, sticky, continuous mass, including the water content of said latex.

8. A process of converting latex into rubber cement, which comprises agitating a mixture of rubber latex, a rubber solvent in amount greatly exceeding said latex, and an acid until the rubber particles have combined with and have been swollen by said solvent to generate a viscous, sticky, continuous mass, including the water content of said latex.

9. A process of converting latex into rubber cement, which comprises agitating a mixture of alkali-preserved rubber latex and a rubber solvent in amount greatly exceeding said latex to produce a viscous, sticky, continuous rubber mass, including the water content of said latex; and simultaneously with such agitation increasing the hydrogen ion concentration of the mixture to accelerate the production of said mass.

10. A rubber cement comprising a mixture of rubber latex and a rubber solvent in amount greatly exceeding said latex, the rubber particles in said mixture being combined with said solvent and being in such fully solvent-swollen condition as to be a continuous, viscous mass containing the latex water distributed therethrough.

11. A process which comprises intimately mixing rubber latex having a solids content considerably in excess of natural latex with a rubber solvent in amount greatly exceeding said latex until the rubber particles have combined with and have been swollen by said solvent into a continuous phase through which the water of said latex is distributed as the disperse phase.

12. A process which comprises intimately mixing rubber latex having a solids content of at least about 60% with a rubber solvent in amount greatly exceeding said latex until the rubber particles have combined with and have been swollen by said solvent into a continuous phase through which the water of said latex is distributed as the disperse phase.

13. A process which comprises intimately mixing rubber latex having a solids content of at least about 60% in the presence of an acidic reagent with a rubber solvent in amount greatly exceeding said latex until the rubber particles have combined with and have been swollen by said solvent into a continuous phase through which the water of said latex is distributed as the disperse phase.

JAMES BARRET CROCKETT.